June 2, 1931.  M. E. MILLER  1,807,856

VALVE

Filed Sept. 18, 1928    2 Sheets-Sheet 1

INVENTOR
Morris E. Miller
BY Geo. B. Pitts
ATTORNEY

June 2, 1931.     M. E. MILLER     1,807,856
VALVE
Filed Sept. 18, 1928     2 Sheets-Sheet 2

INVENTOR
Morris E. Miller
BY
Geo. B. Pitts
ATTORNEY

Patented June 2, 1931

1,807,856

UNITED STATES PATENT OFFICE

MORRIS E. MILLER, OF CANTON, OHIO, ASSIGNOR TO THE H. H. MILLER INDUSTRIES COMPANY, OF CANTON, OHIO, A CORPORATION OF OHIO

VALVE

Application filed September 18, 1928. Serial No. 306,631.

This invention relates to a container having a valve controlled discharge or outlet.

One object of the invention is to provide a container having an improved valve controlled outlet so constructed that complete draining of each charge of liquid is insured and adequate cleaning and sanitary conditions result.

Another object of the invention is to provide a valve that is relatively simple in construction and easily disassembled for cleaning.

Another object of the invention is to provide an improved valve having provision for the escape exteriorly of its casing of any liquid that may leak past the outlet in the container.

A further object of the invention is to so construct the valve and associate it with the walls of the container that no parts of the valve extend within the container, whereby the outlet from the container is free and unobstructed, danger of particles of the liquid remaining or accumulating with the container outlet or valve is eliminated and cleaning of the container, its outlet and the valve is facilitated.

Another object of the invention is to provide a valve having a tapered valved element and tapered seat therefor and means capable of normally maintaining the valve element in operative relation to its seat and so arranged that the valve may be easily operated and the discharge conduit may be readily connected and disconnected from the valve independently of such means.

Other objects of the invention will be apparent to those skilled in the art to which my invention relates from the following description taken in connection with the accompanying drawings wherein, Fig. 1 is a fragmentary view showing a portion of a container and a valve embodying my invention.

Figure 1:
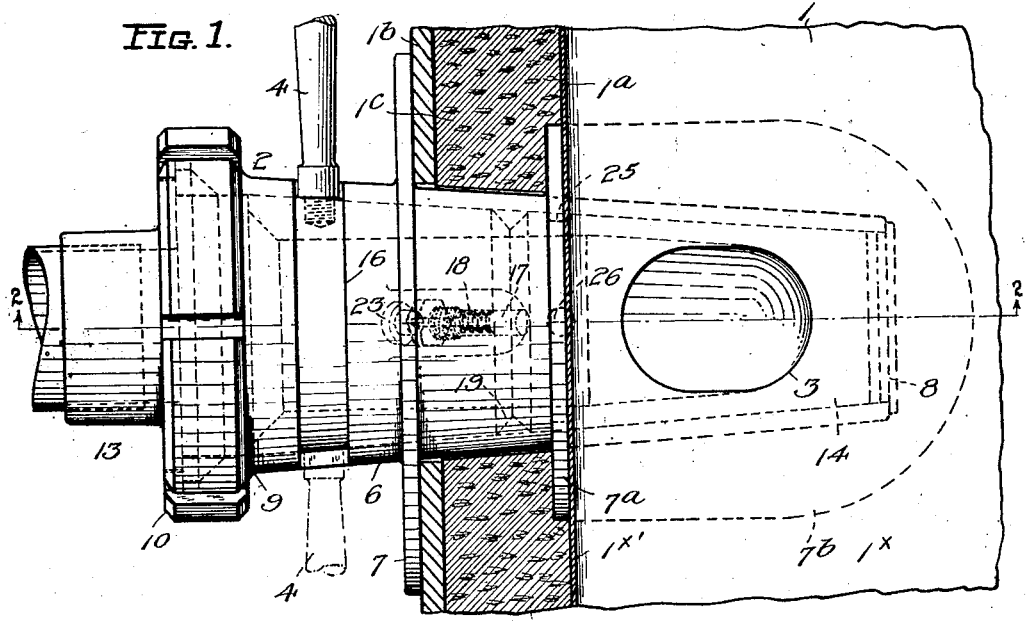
Figure 2:
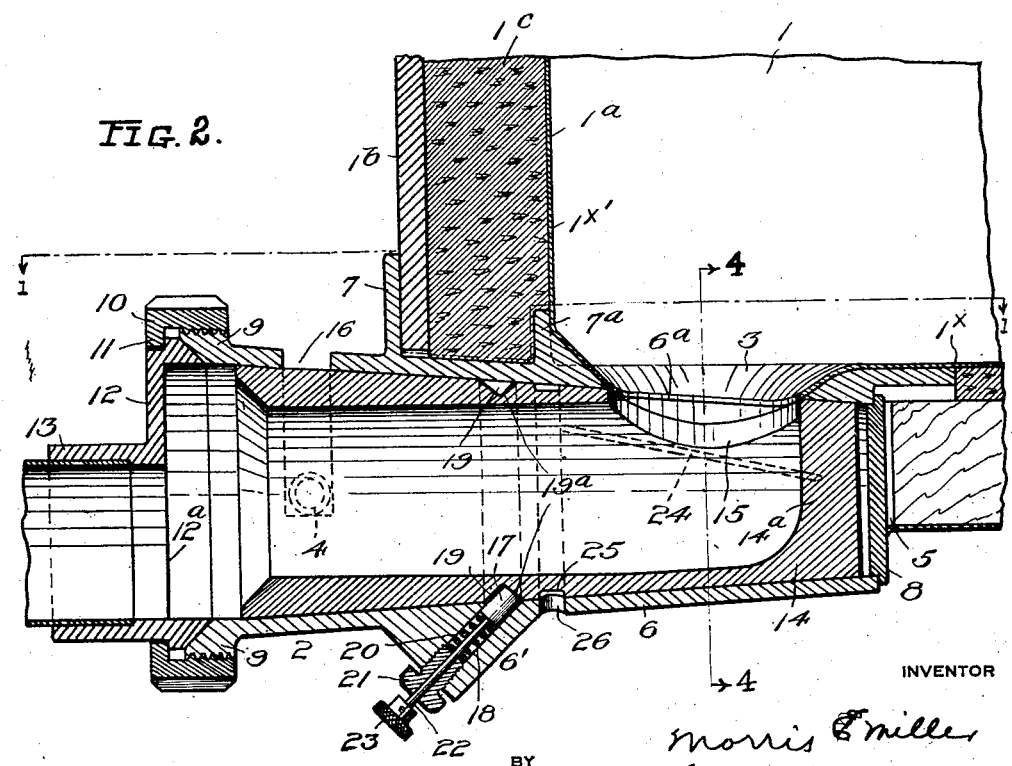
Fig. 2 is a section on the line 2—2 of Fig. 1.

In the drawings, 1 indicates a container for liquid, only a portion thereof being shown. In the application of my invention, I propose to fill the container with milk or cream and if desired such container may be provided with stirring or circulating means or means for circulating a heat transfer medium, or both such means when desired. In such application, the walls of the container are constructed to insure insulation to prevent the transfer of heat through them. As illustrating the preferred construction, the inner wall $1a$ and outer wall $1b$ may be formed from any suitable material and the space between these walls is filled with a suitable non-conductor of heat material, such as cork $1c$. The container 1 may be of any suitable shape in cross section.

Figure 4:
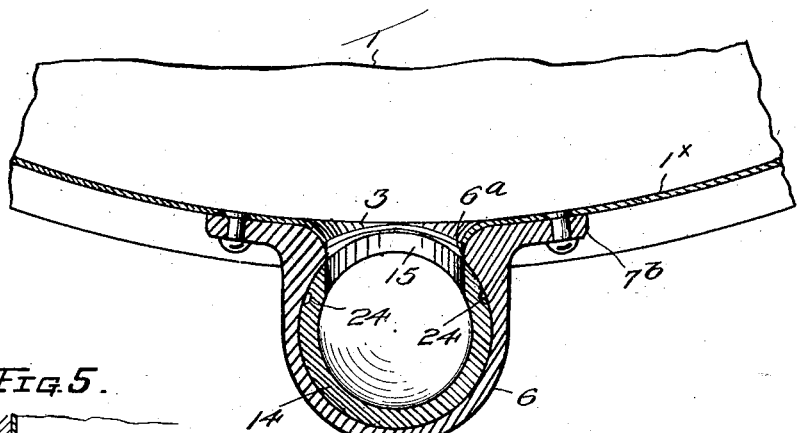
Fig. 4 is a section on the line 4—4 of Fig. 2.

2 indicates as an entirety the valve to control the discharge of the liquid from the container. The valve may be constructed to control the discharge through an outlet 3 located at any desirable position, preferably in the bottom $1x$ of the container. In the construction shown, the outlet 3 is disposed relatively close to one side wall, indicated at $1x'$, whereby the length of the valve structure is reduced and the operating handle 4 may be conveniently located. The wall or walls of the container 1 are cut away, as shown at 5 to accommodate the casing 6 of the valve 2, the casing being provided with one or more flanges 7, $7a$, $7b$, by means of which it is secured in any well known manner to the container walls $1x$, $1x'$. The flange $7b$ is preferably riveted to the wall $1a$ of the bottom $1x$, as shown in Fig. 4.

The inner end of the casing is closed by a plate 8 secured thereto in any suitable manner. The upper side wall of the casing 6 is provided with an opening $6a$ which registers with the opening 3. By preference, the walls of the opening $6a$ are tapered or inclined and the inner wall $1a$ of the container is bent down into face to face relation with these tapered walls and extends to or slightly beyond their edges to eliminate ledges or corners on or in which portions or particles of the liquid can accumulate, instead of flowing out through the valve. The outer end of the casing is provided with a collar 9, threaded on its outer side surface, to removably take a threaded coupling 10. The coupling 10 is provided with an inwardly extending shoulder 11 which engages a coupling element 12, the latter having a tapered ground seat engaging a similar seat on the end wall of the casing 6. In its lower portion and eccentric to the axis of the casing 6, the coupling element is formed with an outlet 12a and a collar 13. The collar 13 may be connected in a suitable manner to a conduit for conveying the liquid to any desirable point.

Figure 3:
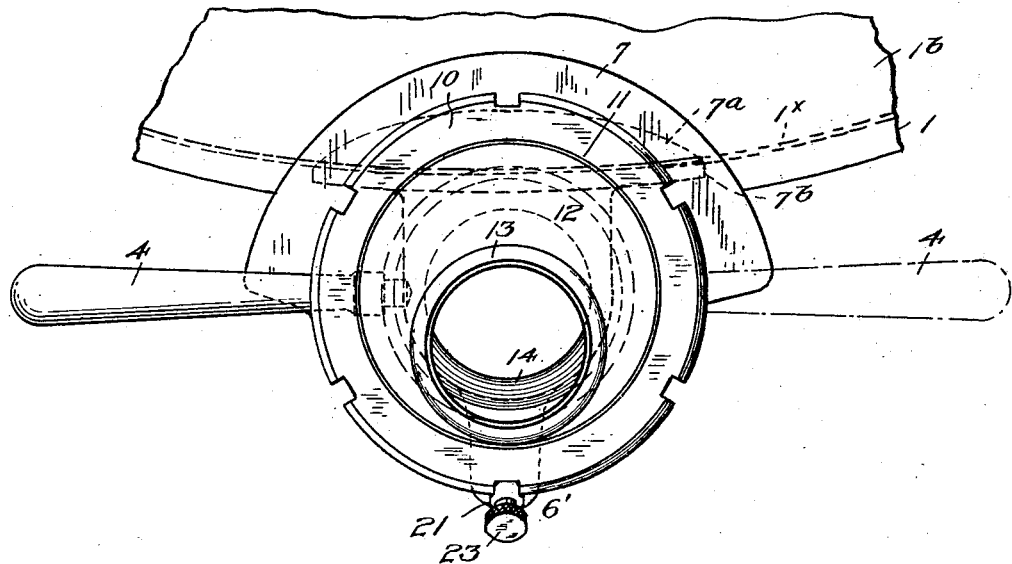
Fig. 3 is a front view of the parts shown in Figs. 1 and 2.

The interior wall of the casing 6 is of conical shape and the exterior wall of the valve element 14 is of similar shape, so that the latter may have a suitable seat and be yieldingly maintained therein by suitable means, indicated as an entirety at 6', constantly acting against the valve element and serving to normally force it against the inner walls of the casing 6. The valve element is hollow, but closed at its inner end by a wall 14a, and formed in its side with a port 15 which registers with the openings 3 and 6a, when in one position. The valve element 14 is capable of rotating in its seat, its port registering with the outlet 3 in the position illustrated in Figs. 1, 2, 3 and 4 and closing the outlet when rotated preferably a half turn as shown in dotted lines in Figs. 1 and 3 and in full lines in Fig. 5. For the purpose of rotating the valve element 14 it is provided with the handle 4 (already referred to) the inner end thereof being removably fixed to or mounted in the outer portion of the valve element and movable through an elongated slot 16 formed in the casing 6 inwardly of the collar 9. By preference, the inner end of the handle 4 is screwed into a threaded opening formed in the wall of the valve element 14.

The constantly acting means 6' may comprise a plunger 17 acted upon by a spring 18 and yieldably pressed thereby against a portion of the valve element 14 in a direction to maintain it yieldingly in its seat, but permitting its free rotation to open and close the outlet 3. As shown, the exterior wall of the valve element 14 is formed inwardly of the handle 4 with an annular groove 19, one wall 19a of which is inclined and forms a bearing surface for the inner end of the plunger 17. The plunger 17 is slidably mounted in an opening 20 formed in the thickened portion of the casing 6. The outer end of the opening 20 is threaded to removably receive a threaded plug 21, which forms an abutment for the outer end of the spring 18. The spring 18 is mounted between the plug 21 and the plunger 17 and normally tends to force the latter against the wall 19a to maintain the valve element yieldingly against its seat, as already set forth, thereby compensating for wear and preventing leakage around the valve element. By preference, the plunger 17 is provided with a stem 22 which extends outwardly through an axial opening formed in the plug 21, its outer end carrying a head 23. By pulling outwardly on the stem head 23, the plunger 17 is withdrawn from groove 19. By removing the handle 4 and withdrawing the plunger 17 from the groove 19, the valve element 14 may be moved outwardly through the casing 6, whereby the valve element and its casing 6 and the outlet 3 may be cleaned.

Figure 5:
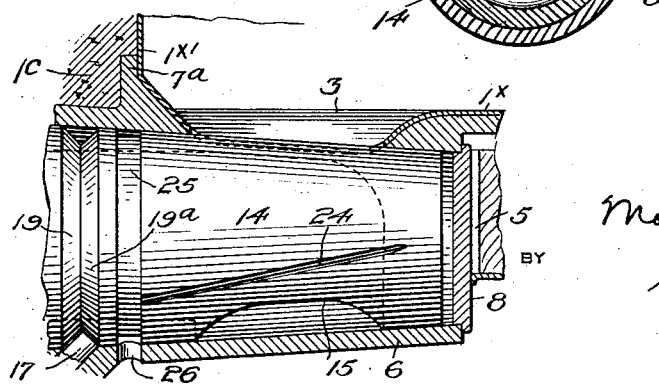
Fig. 5 is a fragmentary section on the line 2—2 of Fig. 1, but showing a portion of the valve element in side elevation and in closed position.

24 indicates one or more escape passages formed in the outer wall of the valve element 14 and communicating at one end with an annular recess 25 formed in the outer wall of said element. I preferably dispose the recess 25 at a point between the groove 19 and the port 3 and form an escape passage 24 at either side of the port 3 leading from a point inwardly thereof to the recess 25. The passages 24 are inclined to the horizontal to insure flow of any liquid which may lead past the outlet 3 when the valve is closed, as shown in Fig. 5. 26 indicates an opening formed in the casing 6 and in registry with the recess 25. The opening 26 permits the escaping liquid to drain through the casing 6 to a point exteriorly of the valve.

In my construction, it will be noted that I provide a close fitting valve structure, at the same time any leakage which may result, is carried to a point exterior of the valve structure and does not contact with its coupling, operating handle or spring operated means nor leak into the conduit through the valve element. It will also be noted that the means for yieldingly maintaining the valve element in position in inwardly and independent of its operating handle and the valve coupling so that the valve element is freely operable and connection and disconnection of the discharge conduit can be made without affecting the spring actuated means.

It will be further noted that the valve casing is so related to the bottom 1x and the valve element 14 is so constructed that no portion of either of these parts project into the container 1 or even through its outlet 3. This construction leaves the outlet entirely open to permit free flow of the material or liquid and also facilitates cleaning of the container 1, its outlet 3 and valve. This construction permits the container to be supported relatively close to the floor and as the valve element 14 is moved horizontally when removed from the casing 6, its disassembly and assembly is readily effected and no additional room below the container is required.

As projections within the outlet 3 are eliminated, walls and ledges for particles of the liquid to accumulate against or on are avoided.

To those skilled in the art to which my invention relates many changes in construction and widely differing embodiments and applications of my invention will suggest themselves without departing from the spirit and scope of my invention. My disclosures and the description herein are purely illustrative and are not intended to be in any sense limiting.

What I claim is:

1. In apparatus of the class described, the combination of a container having an outlet in its lower portion, a valve comprising a hollow casing associated with the container walls and formed with an opening in registry with said outlet, one end of said casing being open and serving as the outlet for said valve and provided with means for connecting a discharge conduit to said casing end, and a valve element consisting of a hollow member closed at its inner end and opening into said casing at its other end, said element removably and rotatably fitting within said casing and formed in its side wall with a port adapted to register in one position with said outlet, and a handle connected to the outer portion of said valve element inwardly of the outlet end of said casing.

2. In apparatus of the class described, the combination of a container having an outlet in its lower portion, a valve comprising a hollow casing associated with the container walls and formed with an opening in registry with said outlet, one end of said casing serving as a discharge outlet, and a valve element consisting of a hollow member closed at its inner end and opening into said casing at its other end, said valve element removably and rotatably fitting within said casing and formed in its side wall with a port adapted to register in one position with said outlet, a handle connected to the outer portion of said valve element inwardly of the discharge end of said casing, and means disposed inwardly of said handle for yieldingly forcing said valve element in one direction.

3. In apparatus of the class described, the combination of a container having an outlet in its lower portion, a valve comprising a hollow casing associated with the container walls and extending laterally in a direction at substantially right angles to the axis of said outlet and formed with an opening in registry with said outlet, one end of said casing serving as a discharge outlet, and a valve element consisting of a hollow member closed at its inner end and opening into said casing at its other end, said valve element removably and rotatably fitting within said casing and formed in its side wall with a port adapted to register in one position with said outlet, and a handle connected to the outer portion of said valve element inwardly of the discharge end of said casing.

4. In apparatus of the class described, the combination of a container having an outlet in its lower portion, a valve comprising a casing associated with the container walls and having an inwardly tapered bore forming a seat and formed in its side wall with an opening in registry with said outlet, said casing extending laterally outwardly, and its outer end serving as a discharge outlet, and a tapered valve element consisting of a hollow member closed at its inner end and opening into said casing at its other end, said valve element removably and rotatably seated within said casing and formed in its side wall with a port adapted to register in one position with said outlet, and a handle connected to the outer portion of said valve element inwardly of the outer end of said casing for rotating said element.

5. In apparatus of the class described, the combination of a container having an outlet in its lower portion, a valve comprising a casing associated with the container walls and having an inwardly tapered bore forming a seat and formed in its side wall with an opening in registry with said outlet, said casing extending laterally outwardly and its outer end serving as a discharge outlet, and a tapered valve element consisting of a hollow member closed at its inner end and opening into said casing at its other end and removably and rotatably seated within said casing and formed in its side wall with a port adapted to register in one position with said outlet, a handle connected to the outer portion of said valve element inwardly of the other end of said casing for rotating said element, and means inwardly of said handle for yieldingly maintaining said element in its seat.

6. In apparatus of the class described, the combination of a container having an outlet in its lower portion, a valve comprising a hollow casing associated with the container walls and formed with an opening in registry with said outlet, one end of said casing serving as a discharge outlet, and a valve element consisting of a hollow member closed at its inner end and opening at its outer end into said casing, said valve element removably and rotatably fitting within said casing and formed in its side wall with a port adapted to register in one position with said outlet, a handle connected to the outer portion of said valve element inwardly of the discharge end of said casing, and means on the outer end of said casing for connecting a conduit thereto.

7. In apparatus of the class described, the combination of a container having an outlet in its lower portion, a valve comprising a casing associated with the container walls and having an inwardly tapered bore forming a seat and formed in its side wall with an opening in registry with said outlet, said casing extending laterally outwardly, a tapered valve element consisting of a hollow member closed at its inner end and removably and rotatably seated within said casing and formed in its side wall with a port adapted to register in one position with said outlet and a handle connected to the outer portion of said valve element for rotating it, and coupling means on the outer end of said casing.

8. In apparatus of the class described, the combination of a container having an outlet in its lower portion, a valve comprising a hollow casing associated with the container walls and formed with an opening in registry with said outlet, a valve element consisting of a hollow member closed at its inner end removably and rotatably fitting within said casing and formed in its side wall with a port adapted to register in one position with said outlet and a handle connected to the outer portion of said valve element, and means permitting the escape of liquid leaking from said outlet, said means comprising a passage formed in the side wall of said valve element at one side and extending longitudinally of its port, an annular recess formed in said side wall and connected to said passage and an opening formed in said casing in registry with said recess.

9. In apparatus of the class described, the combination of a container having an outlet in its lower portion, a valve comprising a hollow casing associated with the container walls and formed with an opening in registry with said outlet, a valve element consisting of a hollow member closed at its inner end removably and rotatably fitting within said casing and formed in its side wall with a port adapted to register in one position with said outlet and a handle connected to the outer portion of said valve element, and escape means permitting the escape of liquid leaking past said outlet, said means comprising an annular recess formed in the outer surface of said valve element inwardly of said handle, a passage formed in said outer surface at one side of the port for said element extending from a point inwardly of said port to said recess and an opening formed in said casing and registering with said recess.

10. In apparatus of the class described, the combination of a container having an outlet in its lower portion, a valve comprising a hollow casing associated with the container walls and formed with an opening in registry with said outlet, a valve element consisting of a hollow member closed at its inner end removably and rotatably fitting within said casing and formed in its side wall with a port adapted to register in one position with said outlet and a handle connected to the outer portion of said valve element, means disposed inwardly of said handle for yieldingly forcing said valve element in one direction, and escape means permitting the escape of liquid leaking past said outlet, said means comprising an annular recess formed in the outer surface of said valve element inwardly of said yieldingly acting means, a passage formed in said outer surface at one side of the port for said element extending from a point inwardly of said port to said recess and an opening formed in said casing and registering with said recess.

In testimony whereof, I have hereunto subscribed my name.

MORRIS E. MILLER.